United States Patent [19]

Sakano

[11] Patent Number: 5,771,104
[45] Date of Patent: Jun. 23, 1998

[54] IMAGE PROCESSING APPARATUS HAVING FUNCTION OF MAGNIFICATION CHANGING IMAGE DATA

[75] Inventor: Yukio Sakano, Fuchu, Japan

[73] Assignee: Ricoh Company Ltd., Tokyo, Japan

[21] Appl. No.: 513,002

[22] Filed: Aug. 9, 1995

[30] Foreign Application Priority Data

Aug. 9, 1994 [JP] Japan .................................. 6-208056
Nov. 21, 1994 [JP] Japan .................................. 6-311113

[51] Int. Cl.⁶ .............................. H04N 1/393; H04N 1/40
[52] U.S. Cl. .......................................... 358/451; 358/448
[58] Field of Search .................................. 358/451–452, 358/528, 537, 448; 382/298

[56] References Cited

U.S. PATENT DOCUMENTS

5,260,804 11/1993 Fukutomi et al. ..................... 358/451
5,416,605 5/1995 Hideshima et al. .................... 358/451
5,436,734 7/1995 Yamauchi et al. ...................... 358/448

Primary Examiner—Edward L. Coles, Sr.
Assistant Examiner—Stephen Brinich
Attorney, Agent, or Firm—Oblon, Spivak, McClelland, Maier & Neustadt, P.C.

[57] ABSTRACT

An image processing apparatus includes a reader unit for reading original image data, a converting unit for converting the original image data to digital image data, a first magnification changing unit for magnifying/reducing the digital image data, an image data modification unit for modifying the magnification changed data, a second magnification changing unit for magnifying/reducing the modified data and a visualizing unit for visualizing an image on the basis of the second magnification changed data. According to the apparatus, the first magnifying/reducing is executed, and after the modification process, the second magnifying/reducing is executed. As a result, the function is improved in aspects of degrees of freedom of the modification operations.

29 Claims, 7 Drawing Sheets

FIG. 4B — PRIMITIVE IMAGE SIGNAL
FIG. 4C — FIRST SUPPOSED IMAGE SIGNAL
FIG. 4D — SECOND SUPPOSER IMAGE SIGNAL
FIG. 4E — FIRST DIFFERENTIAL SIGNAL
FIG. 4F — SECOND DIFFERENTIAL SIGNAL

FIG. 7D

IMAGE PROCESSING APPARATUS HAVING FUNCTION OF MAGNIFICATION CHANGING IMAGE DATA

BACKGROUND OF THE INVENTION

1. Field of the Invention

The present invention generally relates to an image processing apparatus such as a digital copying machine, a printer, a facsimile machine, and so on. The present invention relates, more particularly, to an image processing apparatus having a modification function, e.g. a magnification changing (scaling), of image data.

2. Discussion of the Background

An image processing apparatus having a function of magnification changing image data is proposed in Japanese Laid-Open Patent Application No. 62-256179. In the above image processing apparatus, there is provided only one magnification changing unit.

The magnification changing unit operates on coefficient values for magnifying an image. An original image is magnified to various image sizes corresponding to the coefficient value. The apparatus also has an image data modification unit which stores some image patterns. The magnified image data may be modified to another image data by being converted or adding one of the image patterns over the magnified image data.

As for the image processing according to the apparatus, there are two procedures. In a first procedure, an initial step is magnifying an original image data, and after that, a next step is modifying the magnified image data. In the other procedure, the initial step is modifying an original image data, and after that, the next step is magnifying the modified image data.

Figure 8:
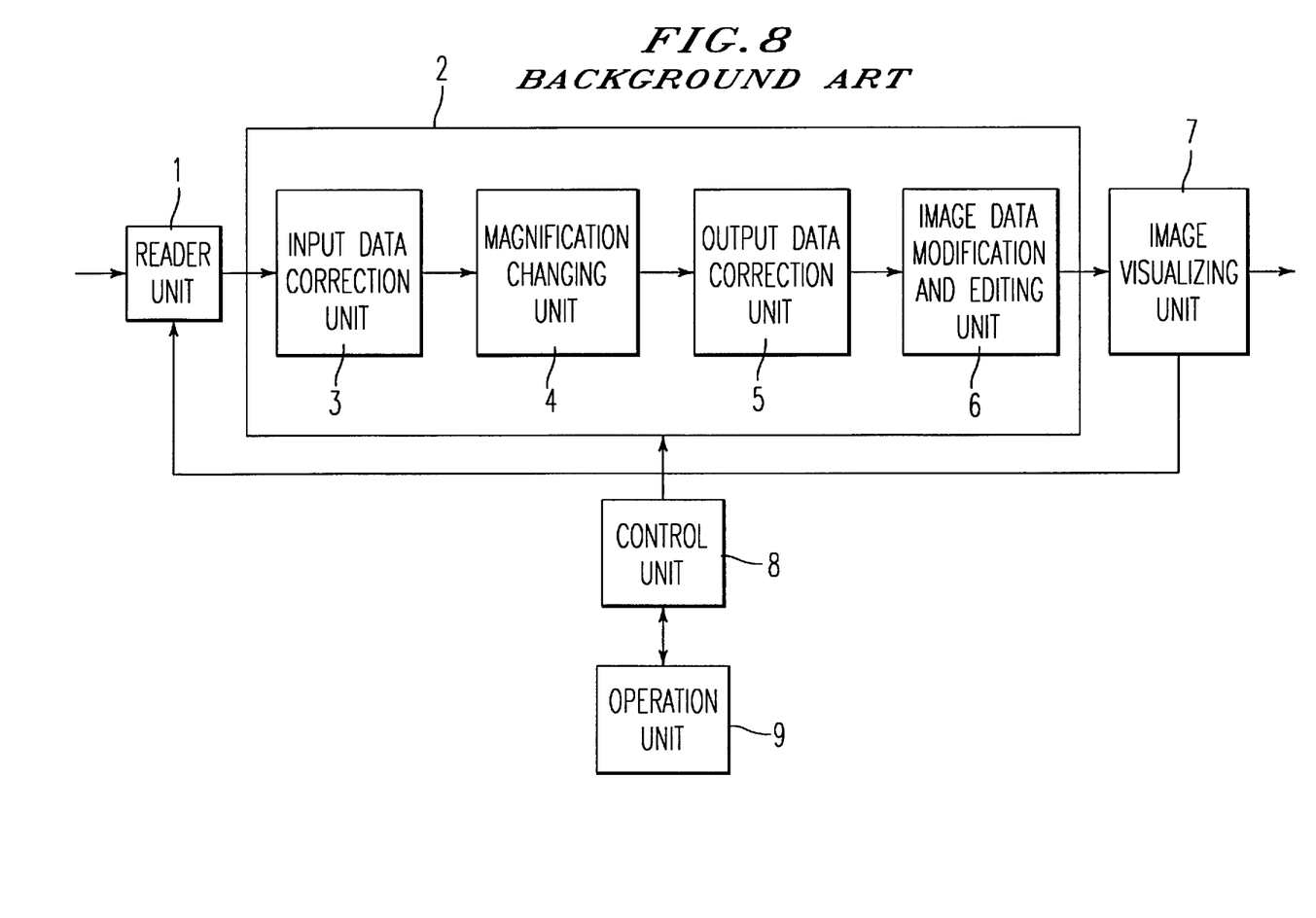
FIG. 8 is a block diagram of an image processing apparatus according to a background art.

FIG. 8 is a block diagram of a background copying machine which shows a main sequence from reading an original image for forming a modified image.

An original image is read by a reader unit 1 such as an optical system or a CCD line sensor. The image signal is an analog signal in the stage. The reader unit 1 further includes an amplification unit which amplifies the image signal transferred from the CCD line sensor. The reader unit 1 also includes an analog to digital converter (A/D) which converts the amplified image signal into a quantized digital signal. In this stage, density information is also quantized. In the quantization process, data expressed in a range of 256 gradation levels are formed (level "0" expresses "black" and level "255" expresses "white").

The digital data output of the reader unit 1 is then transferred to the image processing unit 2. The image processing unit 2 includes an input data correction unit 3, a magnification changing unit 4, an output data correction unit 5, an image data modification and editing unit 6, etc., and performs various image processing operations.

The input data correction unit 3 executes shading corrections, filter corrections, and so on, for the digital signal thus generated. After the input data correction is executed, the data signal is applied, as an image data, to the magnification changing unit 4. The magnification changing unit 4 processes the image data so that the image data is magnified or reduced. The image data after magnification or reduction is transferred to the output data correction unit 5. The output data correction unit 5 performs various kinds of output data correction such as gamma-conversion and gradation processing. The data output from the output data correction unit 5 is then input to the image data modification and editing unit 6. The image data modification and editing unit 6 executes various kinds of modification such as half-toning, outlining (removing an image and leaving only an outline), meshworking (adding a mesh pattern over an image), shadowing, etc. That is, the image data modification and editing unit 6 makes other image data by combining the data from the output data correction unit 5 with one or more kinds of modifications.

Then, after editing is executed, the image data is transferred to the image visualizing unit 7.

Depending on the circumstances, the magnification changing unit 4 is arranged between the image data modification and editing unit 6 and the image visualizing unit 7.

The image visualizing unit 7 may include a laser beam generator and the laser beam generated is operated to be modified on the basis of the image data transferred from the image data modification and editing unit 6. Then, the laser beam forms an electrical latent image on a photoconductor drum. Thereafter, a developing process, a transferring process, a fixing process, and so on, are executed to visualize the image.

A control unit 8 outputs instruction signals to each unit on the basis of inputted information from an operation unit 9. Also, the control unit 8 keeps watch on each unit to determine whether each unit is operating normally or not. If any unit is not operating normally, the control unit 8 outputs a warning signal and the machine generates a warning, such as a warning sound or indication, on a display of the operation unit 9 to inform an operator. The operation unit 9 is used for inputting instruction information such as modification (half-toning, outlining, etc.), data of an image size finally required, number of copied sheets, and so on.

However, in this background device, there is the only one magnification changing unit 4 utilized. Therefore, the image forming procedure is performed by combining a magnification value with one or some of prepared modification patterns at the image data modification and editing unit 6. In the case of using such an apparatus, if an image size which is required finally is predetermined, the procedure is disadvantageous in an aspect of degrees of freedom of how to generate the finally required image.

SUMMARY OF THE INVENTION

Accordingly, one object of the present invention is to provide a novel image processing apparatus that modifies an original image to a required image with improved degrees of freedom of forming images. That is to say, the novel image processing apparatus of the present invention can modify an original image with more various rates of magnification (for example, width of line).

Another object of the present invention is to provide a novel image processing apparatus that modifies an original image to a required image with fewer line buffers.

Yet another object of the present invention is to provide a novel image processing apparatus that modifies an original image to a required image automatically only with inputting modification conditions and an image size of a finally required image.

The present invention achieves these objects by utilizing a device with both first and second magnification changing units. By utilizing first and second magnification changing units in the present invention, after a first magnification/reduction operation, image data can be subject to modifications and/or editing. After these modifications and/or editing, the image data can then be subject to a second magnification/reduction operation. Such an operation of the present invention allows a desired output image to be generated with great freedom.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 3(a)–3(j) are diagrams for explaining general images modified by an image processing apparatus shown in FIG. 2;

DESCRIPTION OF THE PREFERRED EMBODIMENTS

Figure 1:
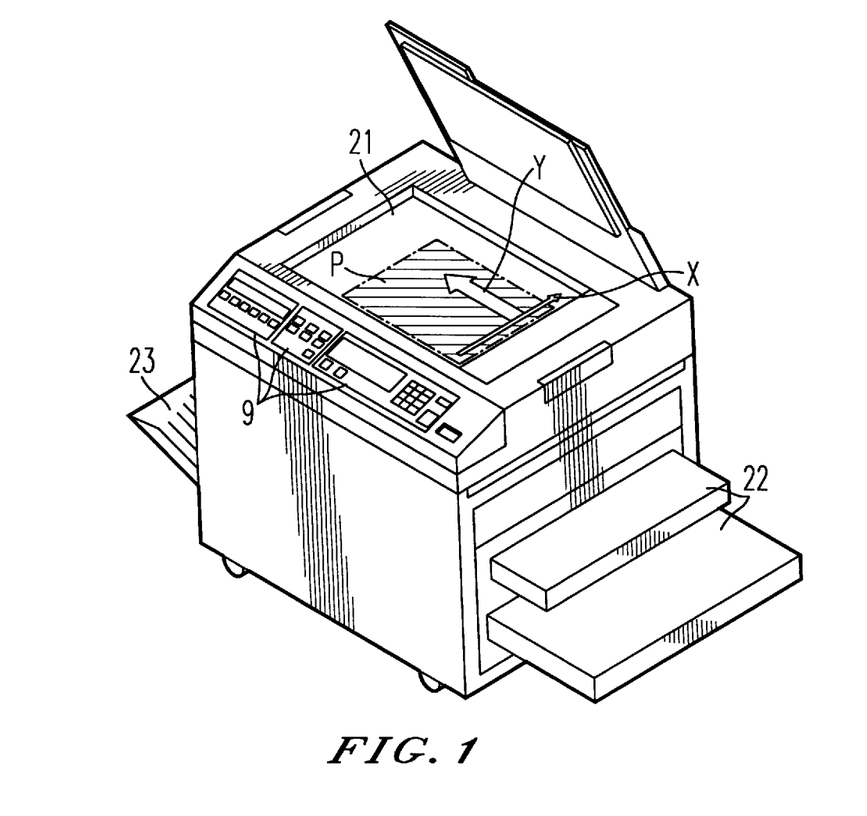
FIG. 1 is a perspective view of an outer appearance of a digital copying machine to which the present invention may be applied.

First, a description will now be given, with reference to FIG. 1, of a digital copying machine to which the present invention may be applied. An original image or document to be copied (P) is placed on an original plate (exposure glass plate) 21. The original is optically read by a reader unit 1 such as a CCD line sensor, see also FIG. 2. The original is read under a condition previously set by means of an operation unit 9, so that the original is represented by, for example, pixels of 400 dpi (dots per inch). During the reading operation, the original is read in a main scanning direction (X) by the CCD line sensor and is read in a sub-scanning detection (Y) by means of a relative movement in which the original is moved in the sub-scanning direction. In the main scanning direction, the CCD line sensor has many CCD sensors along the main scanning direction.

The original image data read by the reader unit 1 are stored temporarily in a memory. Then the data are modified variously on the basis of instructions from operation unit 9. The modified data operates to activate appropriate light emitting diodes in the visualizing unit 7, and the emitted light forms an electrical latent image on a photoconductor. The electrical latent image is visualized on a copy sheet from a sheet cassette 22 by transferring toner. Finally, the toner is fixed by heat and copy sheets are discharged to the tray 23.

Figure 2:
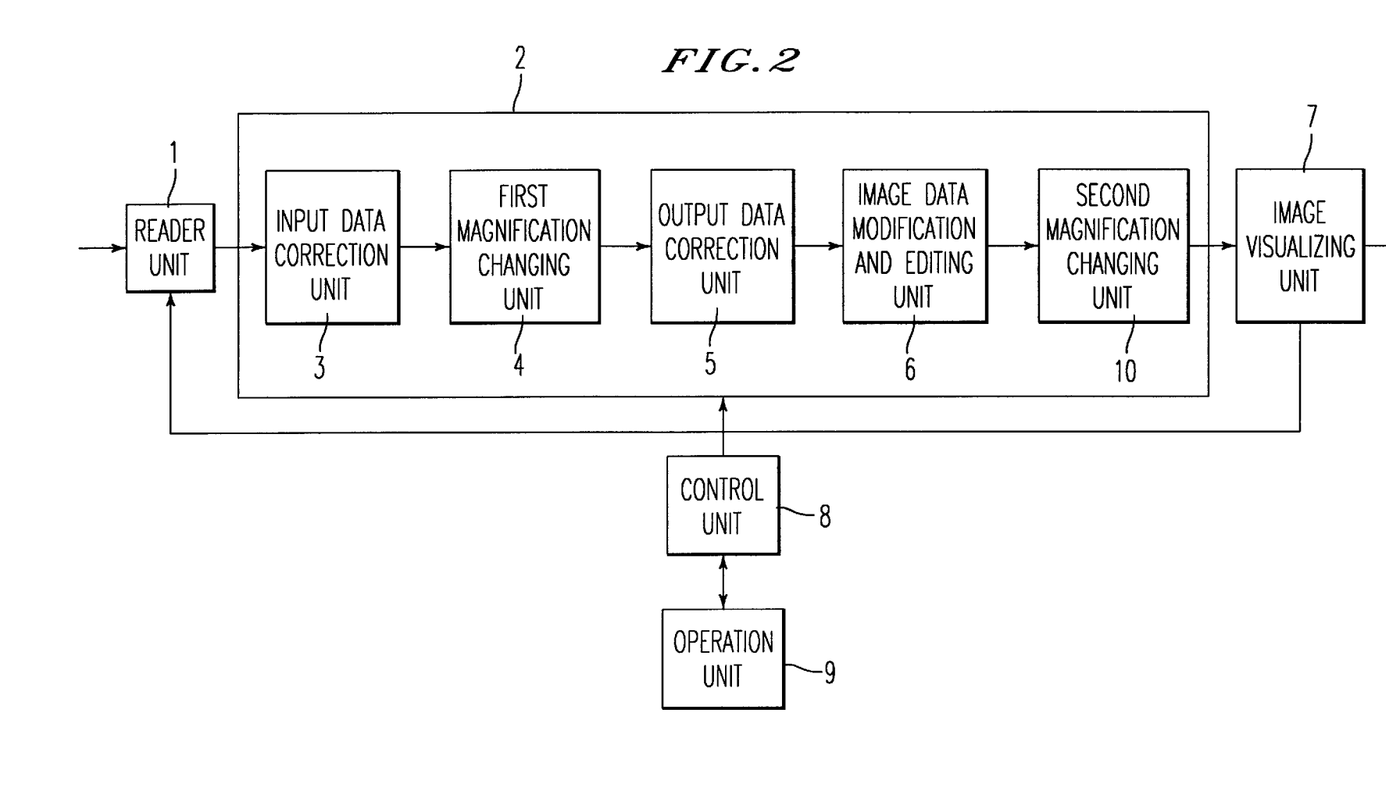
FIG. 2 is a block diagram of an embodiment of an image processing apparatus according to the present invention.

FIG. 2 shows a block diagram of a main process flow of the present image processing apparatus. The reader unit 1 shown in FIG. 2 amplifies an image signal from a CCD line sensor and converts the amplified image signal into a quantized digital signal. Density information is also quantized. In the quantization process, data which is expressed in a range of 256 gradation levels (e.g., black =zero, white =255) may be generated.

Then, the digital data is transferred to an image processing unit 2. The image processing unit 2 includes an input data correction unit 3, a first magnification changing unit 4, an output data correction unit 5, an image data modification and editing unit 6, and a second magnification changing unit 10, etc., which units perform various image processing operations.

The input data correction unit 3 executes shading corrections, filter corrections, and so on for the digital signal generated by reading unit 1. After the input data correction is executed, the digital signal is applied, as an image data, to the first magnification changing unit 4. The first magnification changing unit 4 processes the image data so that the image data is magnified or reduced. The data after magnification or reduction in first magnification changing unit 4 is transferred to the output data correction unit 5. The output data correction unit 5 performs various output data correction processing operations such as gamma-conversion and gradation processing. The image data modification and editing unit 6 executes various kinds of modifications such as half-toning, outlining (removing an image and leaving only an outline), meshworking, shadowing, etc. That is, the image data modification and editing unit 6 generates other image data by combining the data from the output data correction unit 5 with one or more kinds of modifications.

Furthermore, as shown in FIG. 2. the present apparatus includes a second magnification changing unit 10. The image data processed by the image processing unit 2 is transferred to the second magnification changing unit 10 and the second magnification changing unit 10 magnifies or reduces the image data so that an image size finally required is obtained.

And then, the magnified image data output by the second magnification changing unit 10 is transferred to the image visualizing unit 7. The image visualizing unit 7 includes a laser beam generator in which an output laser beam is operated to be modified on the basis of the image data transferred from the image data modification and editing unit 6. The laser beam then forms an electrical latent image on a photoconductor drum.

Thereafter, a developing process, a transferring process, a fixing process, and so on, are executed to visualize the image.

According to the present apparatus, it is significant to include a second magnification changing unit 10, which is now made clear by the following explanation.

Figure 3A:
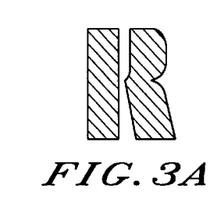
Figure 3B:
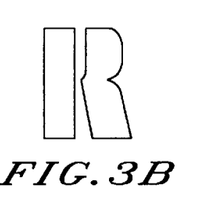
Figure 3C:
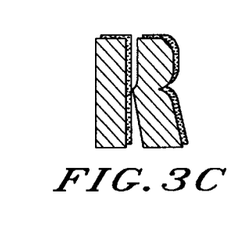
Figure 3D:
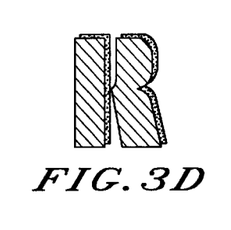
Figure 3E:
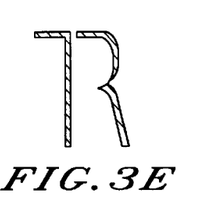
Figure 3G:
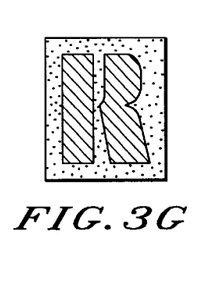
Figure 3H:
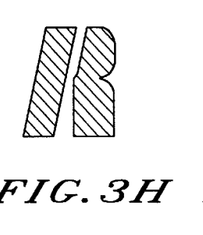
Figure 3I:
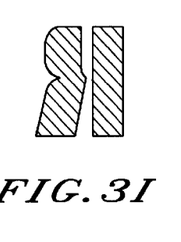
Figure 3J:
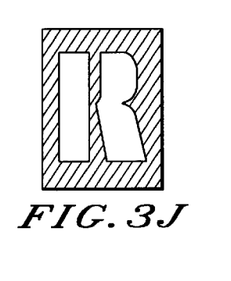
Figure 4A:
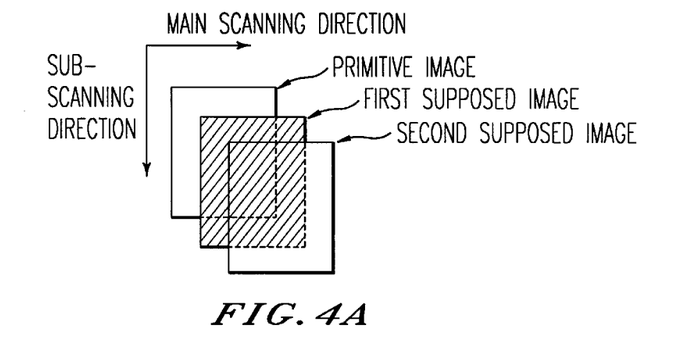
FIGS. 4(a)–4(f) are diagrams for explaining outlined images formed by an image processing apparatus according to the present invention.
Figure 4B:
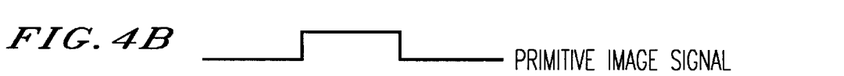
Figure 4C:
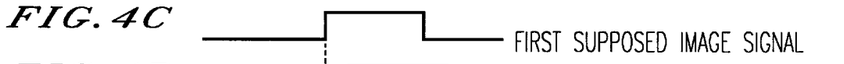
Figure 4D:
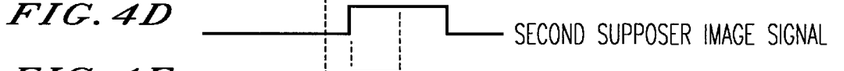
Figure 4E:
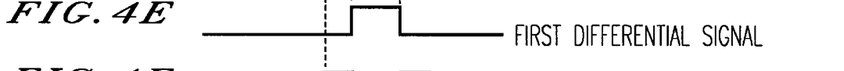
Figure 4F:
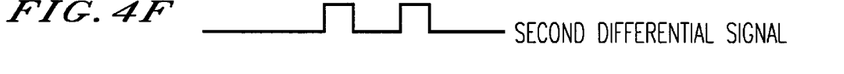
Figure 5A:
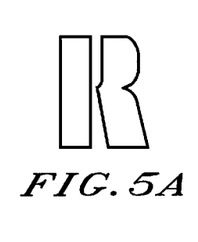
FIGS. 5(a)–5(c) are diagrams for explaining an effect in a case of applying the present invention to an outlining function.
Figure 5B:
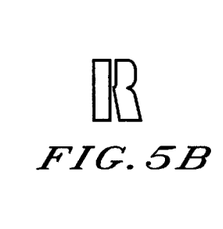
Figure 5C:
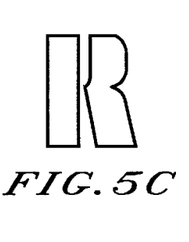

FIG. 3 through FIG. 5 show examples of images formed by the image processing apparatus shown in FIG. 2.

FIG. 3(a) shows an original image and FIG. 3(b) through FIG. 3(j) show various resulting images modified by the image data modification and editing unit 6. FIG. 3(b) shows an example for explaining an outlining function. In this case, required conditions such as a width of an outline of an image are inputted from the operation unit 9. FIG. 3(c) through FIG. 3(e) show examples for explaining a shadowing function. The FIG. 3(c) shows a flat shadowing function. In this case of FIG. 3(c), inputted conditions from the operation unit 9 are the positions of the original image and the shadow. FIG. 3(d) shows a three-dimensional shadowing function. FIG. 3(e) shows a shadow alone function. The shadow alone function indicates a function which removes the original image from the shadowed image.

Further, FIG. 3(f) and FIG. 3(g) show meshworking functions. In FIG. 3(f), a mesh pattern is piled up over the background of the original image. On the other hand, in FIG. 3(g) a mesh pattern is piled up over the original image. In both cases, an operator selects one of the prepared mesh patterns by inputting a selection input from the operation unit 9. FIG. 3(h) shows an example of using a slanting function. In this case, an operator inputs some conditions, such as the angle of the slant, into operating unit 9. FIG. 3(i) shows an example of using a mirroring function. In this case of FIG. 3(i), a reversal image is obtained by reversing the original image. Lastly, FIG. 3(j) shows an example of using a dot density converting function. In this case of FIG. 3(j), the turned over image is obtained by turning over the dot density of the original image.

The images such as shown in FIG. 3(b) through FIG. 3(j) are processed in the present image processing apparatus. In more detail, modified images are processed by the output data correction unit 5 and the image data modification and editing unit 6.

For example, referring to FIG. 4, the outlining function shown in FIG. 3(b) is explained as follows. At first, as shown in FIG. 4(a), a first supposed image (an image generated internal to the present image processing apparatus) and a second supposed image which are different from each other by a time delay are generated against a primitive image in both of the scanning directions. The first signal, the second signal, and the third signal shown in respective FIGS. 4(b), 4(c) and 4(d) correspond to the primitive image, the first supposed image, and the second supposed image, respectively. Then, a first differential signal, see FIG. 4(e), is generated by performing a logical AND operation of the primitive image signal (FIG. 4(b)) and the second supposed image signal (FIG. 4(d)). A second differential signal is generated from the first supposed image signal (FIG. 4(c)) and the first differential signal (FIG. 4(e)) by taking an exclusive OR of these two signals. The second differential signal represents the outlined image as shown in FIG. 3(b).

In the above-mentioned situation, in order to make the outline width wide, because there is the only one magnification changing unit 4 in the above-mentioned background apparatus of FIG. 8, a long period for the delay is required. Particularly, a long delay in the sub-scanning direction is needed, and therefore the background apparatus requires a great number of line buffers. This means that the structure of the background apparatus must be complex and the cost is great. Furthermore, in the case of the shadowing function, in order to make a long shadow, it is also required for the background apparatus to have a great many line buffers and to require a long period for the delay. The same problem arises in the case of the outlining function.

In the present apparatus, as shown in FIG. 2, there are two magnification changing units utilized (the first magnification changing unit 4 and the second magnification changing unit 10) and the apparatus of the present invention can perform two magnification changing functions. Therefore, the above-mentioned problems in the background device of FIG. 8 are solved all at once in the system of the present invention. Furthermore, in the case of various patterns being used in the meshworking function as shown in FIG. 3(f) and FIG. 3(g), the background apparatus of FIG. 8 requires storing a great many meshwork patterns in the image data modification and editing unit 6, and the background apparatus also has the above-mentioned problem of increased cost. The present apparatus also solves these problems.

In the procedure using the present apparatus, the original image read by the reader unit 1 shown in FIG. 2 may be reduced by the first magnification changing unit 4, and then the reduced image data is modified by the image data modification and editing unit 6. And then the modified image data may be magnified by the second magnification changing unit 10. By executing these procedures in this order, the rate of the outline width of the outlined image or the shadow length of the shadowed image can be increased. A contrary operation to reduce the outline width of the outlined image can also be effectuated.

FIG. 5 shows a diagram for explaining an effect in the case of applying the present apparatus to the outlining function. FIG. 5(a) shows an example of an outlining function which is outlined for a predetermined outline width (maximum 0.8 mm in this example) to the original image shown in FIG. 3(a). FIG. 5(b) shows a case of reducing the original image by 50 percent by the first magnification changing unit 4 and executing an outlining function to the reduced image for 0.8 mm as the outline width. The outline width 0.8 mm in FIG. 5(b) is the same as in the example shown in FIG. 5(a). FIG. 5(c) shows a case of magnifying the reduced image shown in FIG. 5(b) by 200 percent by the second magnification changing unit 10. The outline width of the image shown in FIG. 5(c) (1.6 mm) is now as twice that shown in FIG. 5(a). However, the image size of the original shown in FIG. 5(c) is the same as that shown in FIG. 5(a). In this way, in using the present apparatus, the outline width of the modified image can be changed freely even if the image size is the same as the original image. The range of the outline width of the image executed outlining function can be changed by controlling the reduction/magnification by the first magnification changing unit 4 and the reduction/magnification by the second magnification changing unit 10. That is to say, as an example, if the reduction by the first magnification changing unit 4 is increased and the magnification by the second magnification changing unit 10 is executed after the modifying process, an image data in which an outline width is magnified can be obtained easily. As a contrary example, if a magnification by the first magnification changing unit 4 is implemented and a reduction by the second magnification changing unit 10 is executed after the modifying process, an image data in which an outline width is reduced can be obtained easily.

If the apparatus of the present invention is organized when conditions relating to an image processing are inputted from the operation unit 9, the magnification/reduction changing rate of the first magnification changing unit 4 and the second magnification changing unit 10 can be determined automatically, and the image processing apparatus of the present invention could be easily operative as follows.

Figure 6:
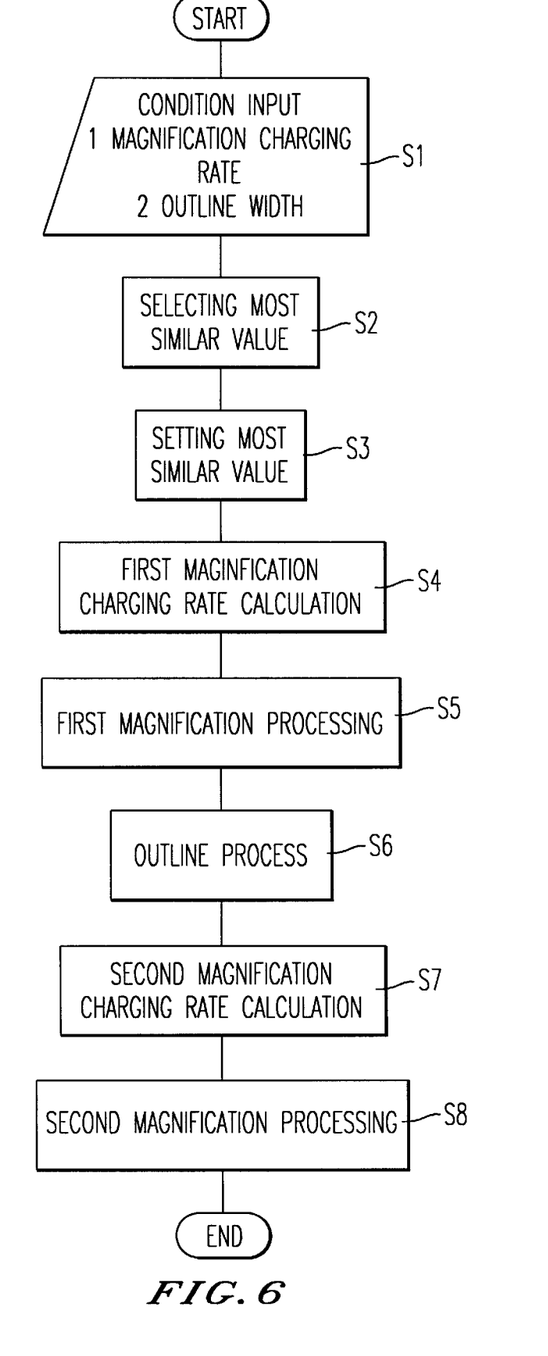
FIG. 6 is an operation flow chart showing an outlining process by an image processing apparatus according to the present invention.

Referring to the flow chart shown in FIG. 6, an outlining process of the present invention is explained, as an example.

In step S1, conditions such as a magnification changing rate of a formed image size to an original image size and a finally required outline width are inputted from the operation unit 9. In the example shown in FIGS. 5(a)–5(c), the magnification changing rate of the image forming size is equal to that of the original image size (i.e. the output image is the same size as the input image) and the finally required outline width is 1.6 mm.

The contents inputted from the operation unit 9 are transferred to the control unit 8 shown in FIG. 2. The control unit 8 executes processes such as selecting the suitable kinds of modifications, determining a magnification changing rate, and so on. Then the control unit 8 transfers the information to each unit. This operation is clarified in detail by the following steps S2 to S4.

In step S2, the control unit 8 selects a most similar value of the outline width input at step S1 from among prepared values for the outlining function in the image data modifying unit 6 (in this example, the unit 6 has four data of outline widths of 0.2 mm/0.4 mm/0.6 mm/0.8 mm). In this example, the desired outline width input at step S1 is 1.6 mm and therefore 0.8 mm is set at step S2. In step S3, the control unit 8 transfers the selected value (0.8 mm) to the image data modification and editing unit 6 to be set in the image data modification and editing unit 6.

In step S4 the first magnification changing rate "A" is calculated. The first magnification changing rate "A" is expressed by the following equation:

$$A=T2/T1$$

(wherein: "T1" is the value of the outline width which is inputted at step S1, and "T2" is the selected value at step S2.) In this case, value "T1" is 1.6 mm and value "T2" is 0.8 mm. Therefore, "A" is set to 50 percent in this example. The calculation is executed by the control unit 8.

The control unit 8 transfers the information of the first magnification changing rate "A" to the first magnification changing unit 4 and the magnification changing unit 4 magnifies the original image on the basis of the first magnification changing rate "A".

In step S6, the outlining process is executed for the image data which is magnified by the first magnification changing unit 4 such that the outline width of the outlined image is 0.8 mm (this value is set in the image data modification and editing unit 6).

In step S7, an expression for the second magnification changing rate is calculated. The second magnification changing rate is calculated automatically on the basis of the finally required image size inputted from the operation unit 9. The second magnification changing rate "B" is expressed by the following equation:

$$B=1/A$$

(wherein: "A" is the value of the above-mentioned first magnification changing rate). In this example, value "A" is 50. Therefore, "B" is set as 200 percent. The calculation is executed by the control unit 8.

In step S8, the control unit 8 sets the value of the second magnification changing rate on the second magnification changing unit 10. The second magnification is executed for the image data modified by the image data modification and editing unit 6.

The second magnification changing rate is 200 percent (twice) of the original image data, and therefore the outline width of the finally formed image size becomes the desired 1.6 mm.

FIG. 7 is an example for explaining a meshworking function. FIG. 7 shows a case for meshworking and magnifying the original image by the first magnification changing unit 4, and reducing the modified image by the second magnification changing unit 10 after modification. FIG. 7(a) shows an original image. The original image is magnified by 200 percent of the original image by the first magnification changing unit 4. FIG. 7(b) shows one of the mesh patterns in the image data modification and editing unit 6. A mesh pattern is selected by the control unit 8 and the mesh pattern is synthesized by the image data modification and editing unit 6 to make a meshworked image. FIG. 7(c) shows the synthesized image. And then, a reducing process is executed by the second magnification changing unit 10. FIG. 7(d) shows a finally obtained image after reduction by 50 percent and the image processing unit 2 outputs the image data after reduction.

Figure 7A:
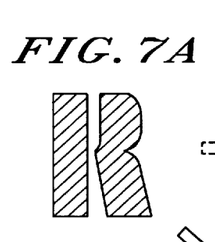
FIGS. 7(a)–7(d) are diagrams for explaining forming images meshworked by the image processing apparatus shown in FIG. 2.
Figure 7B:
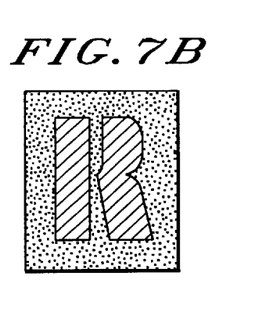
Figure 7C:
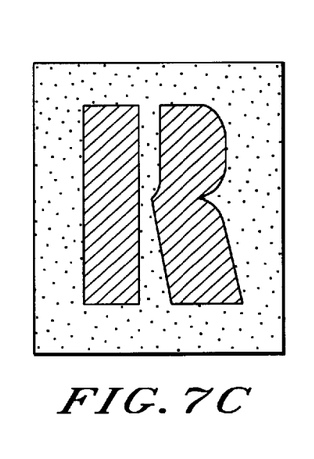
Figure 7D:
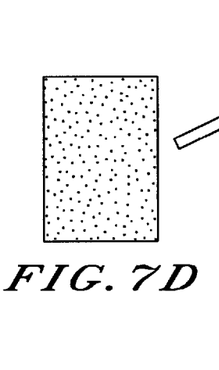

Comparing the finally obtained image shown in FIG. 7(d) with the original image shown in FIG. 7(a) and the prepared mesh pattern in the image data modification and editing unit 6 shown in FIG. 7(b), it is understood that though the formed image size of FIG. 7(d) is the same as the original image size of FIG. 7(a), the mesh pattern shown in FIG. 7(d) is finer than that shown in FIG. 7(b). In this way, in the present invention even if a large number of various density of different mesh patterns are stored, an image with a required density of a meshwork pattern can be obtained easily by changing the magnification changing rate in the second magnification changing unit 10 variously. Especially, as explained above, in a case that the process by the first magnification changing unit 4 is an enlargement and the process by the second magnification changing unit 10 is a reduction, the present operation is more effective in a modifying process.

Also, in a case that the process by the first magnification changing unit 4 is a reduction and the process by the second magnification changing unit 10 is an enlargement, the present operation is more effective. This is because the finally obtained image size becomes as large as the original image size, and moreover, a modification pattern size is different from the prepared pattern size. Moreover, if a required image forming size is as large as an original image size, the rate of the second magnification changing unit 10 can be determined automatically corresponding to the rate of the first magnification changing unit 4. This results in an improvement of operability of the apparatus of the present invention.

Comparing the present apparatus of FIG. 2 with the background apparatus of FIG. 8, not only are the above-mentioned merits realized, but the following merits are also achieved. In using the present apparatus, an original image data read by the reader unit 1 can be magnified or reduced by the first magnification changing unit 4 before modification of an image data. And the image data after a modification process is executed can be reduced or magnified by the second magnification changing unit 10. Therefore, a pattern density or line width in the modification process can be adjusted to correspond to a finally required image size by modification processing of the image magnified or reduced by the first magnification changing unit 4. That is to say, a rate of the original image size in a modification process to the pattern density (pattern size) or the line width can be determined freely. Moreover, by using the second magnification changing unit 10, a finally required image size can be selected freely.

Generally, in the apparatus of the present invention shown in FIG. 2, many grades of gradation processes are executed in the output image correction unit 5. However, in a case of an image data modification such as half-toning, outlining, meshworking, shadowing, etc. is executed by the image data modification and editing unit 6, many grades of a gradation process data are not needed. Therefore, it may be more effective that a binary valuing unit is found in the gradation unit in the output image correction unit 5 or a binary valuing unit is formed between the gradation unit in the output image correction unit 5 and the image data modification and editing unit 6. This is because the structure of hardware becomes simplified. Moreover, the modification processes in the present invention do not need as many memories and hardware as the background apparatus of FIG. 8, and therefore, merits are achieved from the point of lower cost and decreased processing period in the present invention.

Furthermore, the operation unit 9 of the present apparatus may also comprise an area specification unit. In the area specification unit, areas where the above-mentioned various kinds of modification processes are executed are specified. For specifying an area, some methods are put to practical use. Those are, for example, the methods that writing a flame of an area in an original by special writing implements, inputting the values of size from the operation unit 9, detecting coordinates of X-axis and Y-axis by using an infrared rays generating/detecting device, etc., set on an original plate 21, and so on. In the present apparatus, any method can be adopted.

In some cases, there is a restriction of a size from the hardware point of view such as memories in the image data modification and editing unit 6 used in the image data modifying process and the image size being modified has a limit. However, even in a such a situation, the above-mentioned area specification unit is effective. For example, after reducing an original image by the first magnification changing unit 4, a specified area of the reduced image can be modified. If using the method, the modification is not restricted by the memory size. Moreover, the modification process for the specified area can be executed completely, and then, the second magnification changing process is executed so that the indicated image size (which is on the basis of the inputted conditions) is obtained by the second magnification changing unit 10.

Also, it is more convenient that the operation unit 9 has a display unit which can show the original image in a condition of reduction, because the original image read by the reader unit 1 is reduced and the reduced image can be shown on the display unit of the operation unit 9. Moreover, it is also possible to input an area of the original image where the modification process is required on the display unit of the operation unit 9 directly by using an inputting device such as a pen. That is to say, it becomes possible that the degree of freedom of the modification process is increased by using the display unit in combination with the second magnification changing unit 10.

The present apparatus, as mentioned above, makes it possible to determine the first magnification changing rate and the second magnification changing rate suitably and automatically, on the basis of conditions input to the operation unit 9. Therefore, the first magnification changing rate and the second magnification changing rate do not need to be inputted consciously. That is to say, by only inputting required modification conditions, a finally formed image size, and so on, the required image can be obtained.

In the present apparatus, as mentioned above, it is also possible to determine areas which should be modified clearly because of the area specification unit of the operation unit 9. That is to say, because the first magnification changing rate and the second magnification changing rate are applied to only the specified area, it is not needed to input conditions, being conscious of the first magnification changing rate and the second magnification changing rate or size of area.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. An image processing apparatus comprising:
   means for reading original image data;
   means for converting said original image data to digital image data;
   means for first reducing/magnifying said digital image data to generate first reduced/magnified data by selecting one of reducing or magnifying said digital image data;
   means for modifying said first reduced/magnified data to generate modified data;
   means for second reducing/magnifying said modified data to generate second reduced/magnified data by selecting one of reducing or magnifying said modified data; and
   means for visualizing an output image on the basis of said second reduced/magnified data.

2. The image processing apparatus as claimed in claim 1, further comprising:
   means for editing said modified data by combining said modified data with prepared patterns.

3. An image processing apparatus comprising:
   means for reading original image data;
   means for converting said original image data to digital image data;
   means for first reducing/magnifying said digital image data to generate first reduced/magnified data by selecting one of reducing or magnifying said digital image data;
   means for editing said first reduced/magnified data by combining said first reduced/magnified data with prepared patterns to generate edited data;
   means for second reducing/magnifying said edited data to generate second reduced/magnified data by selecting one of reducing or magnifying said edited data; and
   means for visualizing an output image on the basis of said second reduced/magnified data.

4. The image processing apparatus as claimed in claim 3, further comprising:
   means for modifying said edited data.

5. The image processing apparatus as claimed in either one of claims 1 or 3, wherein the original image data comprises dot data, and further comprising means for binary valuing the dot data of the original image data based on a predetermined threshold density value.

6. The image processing apparatus as claimed in claim 5, wherein said means for converting and said means for binary valuing are constructed as a same means.

7. The image processing apparatus as claimed in either one of claims 1 or 3, wherein said means for first reducing/magnifying operates to magnify and said means for second reducing/magnifying operates to reduce.

8. The image processing apparatus as claimed in either one of claims 1 or 3, wherein said means for first reducing/magnifying operates to reduce and said means for second reducing/magnifying operates to magnify.

9. The image processing apparatus as claimed in either one of claims 1 or 3, further comprises means for operating from which conditions for an image size finally required, modification, and editing are inputted.

10. The image processing apparatus as claimed in claim 9, wherein said means for operating comprises means for specifying areas for which the modification and editing are executed.

11. An image processing apparatus comprising:
    a scanner for reading original image data;
    an analog to digital converter for converting said original image data to digital image data;
    a first magnification changer for reducing/magnifying said digital image data to generate first reduced/magnified data by selecting one of reducing or magnifying said digital image data;
    a modificater for modifying said first reduced/magnified data to generate modified data;
    a second magnification changer for reducing/magnifying said modified data to generate second reduced/ magnified data by selecting one of reducing or magnifying said modified data; and a laser beam generator for visualizing an output image on the basis of said second reduced/magnified data.

12. The image processing apparatus as claimed in claim 11, further comprising:

an editor for editing the modified data by combining said first reduced/magnified data with prepared patterns.

13. An image processing apparatus comprising:

a scanner for reading original image data;

an analog to digital converter for converting the original image data to digital image data;

a first magnification changer for reducing/magnifying said digital image data to generate first reduced/magnified data by selecting one of reducing or magnifying said digital image data;

an editor for editing the first reduced/magnified data by combining said first reduced/magnified data with prepared patterns to generate edited data;

a second magnification changer for reducing/magnifying said edited data to generate second reduced/magnified data by selecting one of reducing or magnifying said edited data; and a laser beam generator for visualizing an output image on the basis of said second reduced/magnified data.

14. The image processing apparatus as claimed in claim 13, further comprising:

a modificater for modifying said edited data.

15. The image processing apparatus as claimed in either one of claims 11 or 13, wherein the original image data includes dot data, and further comprising a binary valuer which values the dot data of the original image based on a predetermined threshold density value.

16. The image processing apparatus as claimed in claim 15, wherein said analog to digital converter and said binary valuer are constructed as a same unit.

17. The image processing apparatus as claimed in either one of claims 11 or 13, wherein said first magnification changer operates to magnify and said second magnification changer operates to reduce.

18. The image processing apparatus as claimed in either one of claims 11 or 13, wherein said first magnification changer operates to reduce and said second magnification changer operates to magnify.

19. The image processing apparatus as claimed in either one claims 11 or 13, further comprising an operation unit from which conditions for image size finally required, modification, and editing are inputted.

20. The image processing apparatus as claimed in claim 19, wherein said operation unit comprises a specifying area unit for specify an area for which the modification or editing are executed.

21. A method of processing an image comprising the steps of:

reading original image data optically;

converting said original image data to digital image data;

first reducing/magnifying said digital image data to generate first reduced/magnified data by selecting one of reducing or magnifying said digital image data;

modifying said first reduced/magnified data to generate modified data;

second reducing/magnifying said modified data to generate second reduced/magnified data by selecting one of reducing or magnifying said edited data; and visualizing an output image on the basis of said second reduced/magnified data.

22. The method of processing an image as claimed in claim 21, further comprising the step of:

editing said modified data by combining said modified data with prepared patterns.

23. A method of processing an image comprising the steps of:

reading original image data optically;

converting said original image data to digital image data;

first reducing/magnifying said digital image data to generate first reduced/magnified data by selecting one of reducing or magnifying said digital image data;

editing said first reduced/magnified image data by combining said first reduced/magnified data with prepared patterns to generate edit ed data;

second reducing/magnifying said edited data to generate second reduced/magnified data by selecting one of reducing or magnifying said edited data; and visualizing an output image on the basis of said second reduced/magnified data.

24. The method of processing an image as claimed in claim 23, further comprising the step of:

modifying said edited data.

25. The method of processing an image as claimed in either one of claims 21 or 23, wherein the original image data includes dot data and further comprising a step of:

binary valuing each dot data of the original image data on the basis of a predetermined threshold density value and before the step of modifying or editing.

26. The method of processing an image as claimed in either one of claims 21 or 23, wherein said step of first reducing/magnifying operates to magnify and said step of second reducing/magnifying operates to reduce.

27. The method of processing an image as claimed in either one of claims 21 or 23, wherein said step of first reducing/magnifying operates to reduce and said step of second reducing/magnifying operates to magnify.

28. The method of processing an image as claimed in either one of claims 21 or 23, further comprises a step of inputting conditions for an image size finally required, modification, and editing, and automatically determining rates of said first reducing/magnifying and said second reducing/magnifying.

29. The method of processing an image as claimed in claim 28, further comprises a step of specifying areas for which the modification or editing are executed.

* * * * *